(12) United States Patent
Cha

(10) Patent No.: US 12,085,120 B2
(45) Date of Patent: Sep. 10, 2024

(54) ONE-TOUCH CONNECTION DEVICE FOR CONNECTING REINFORCING BARS

(71) Applicant: Seung Ho Cha, Duluth, GA (US)

(72) Inventor: Seung Ho Cha, Duluth, GA (US)

( * ) Notice: Subject to any disclaimer, the term of this patent is extended or adjusted under 35 U.S.C. 154(b) by 374 days.

(21) Appl. No.: 17/370,915

(22) Filed: Jul. 8, 2021

(65) Prior Publication Data

US 2023/0008119 A1     Jan. 12, 2023

(51) Int. Cl.
*F16B 7/04* (2006.01)
*E04C 5/16* (2006.01)

(52) U.S. Cl.
CPC ............ *F16B 7/0426* (2013.01); *E04C 5/165* (2013.01)

(58) Field of Classification Search
CPC .............................................. Y10T 403/5713
See application file for complete search history.

(56) References Cited

U.S. PATENT DOCUMENTS

| | | | | |
|---|---|---|---|---|
| 3,234,603 A * | 2/1966 | Leuthy | ................... | E04C 5/165 164/108 |
| 7,905,066 B2 * | 3/2011 | Pryor | ....................... | E04B 1/26 403/111 |
| 11,619,048 B1 * | 4/2023 | Lee | ....................... | F16B 7/0406 52/848 |
| 2019/0234443 A1 * | 8/2019 | Man | ........................ | F16B 7/182 |
| 2021/0355683 A1 * | 11/2021 | Won | ....................... | F16B 7/0406 |

FOREIGN PATENT DOCUMENTS

| | | | | |
|---|---|---|---|---|
| KR | 10-0462291 B1 | 12/2004 | | |
| KR | 10-1003302 B1 | 12/2010 | | |
| KR | 10-1259959 B1 | 5/2013 | | |
| KR | 10-1602399 B1 | 3/2016 | | |
| KR | 101654145 B1 * | 9/2016 | ............ | E04C 5/165 |
| KR | 20180047818 A * | 5/2018 | ............ | E04C 5/165 |
| KR | 101890375 B1 * | 8/2018 | ............ | E04C 5/165 |
| WO | WO-2018012797 A1 * | 1/2018 | ............ | E04C 5/165 |
| WO | WO-2019078628 A1 * | 10/2018 | ............ | E04C 5/165 |
| WO | WO-2019196741 A1 * | 10/2019 | ............ | E04C 5/165 |

* cited by examiner

*Primary Examiner* — Matthew R McMahon
(74) *Attorney, Agent, or Firm* — Hauptman Ham, LLP

(57) ABSTRACT

A non-threaded, one-touch connection device for connecting reinforcing bars includes a pair of coupler bodies fastened together by a connector and each of the coupler bodies having a hollow portion for receiving the reinforcing bar. An inner diameter of the coupler body gradually increases from an entrance of the coupler body to an end opposite to the entrance. A lock is placed in the coupler body. The lock includes slits and wall parts partially separated by the slits. The lock further includes a breaking disc configured to break away from the lock. An elastic member is placed between the connector and the lock to apply an elastic force to move the lock toward the entrance when the reinforcing bar is fastened to the lock. The coupler body further has a checking hole to allow concrete to flow in and out.

9 Claims, 6 Drawing Sheets

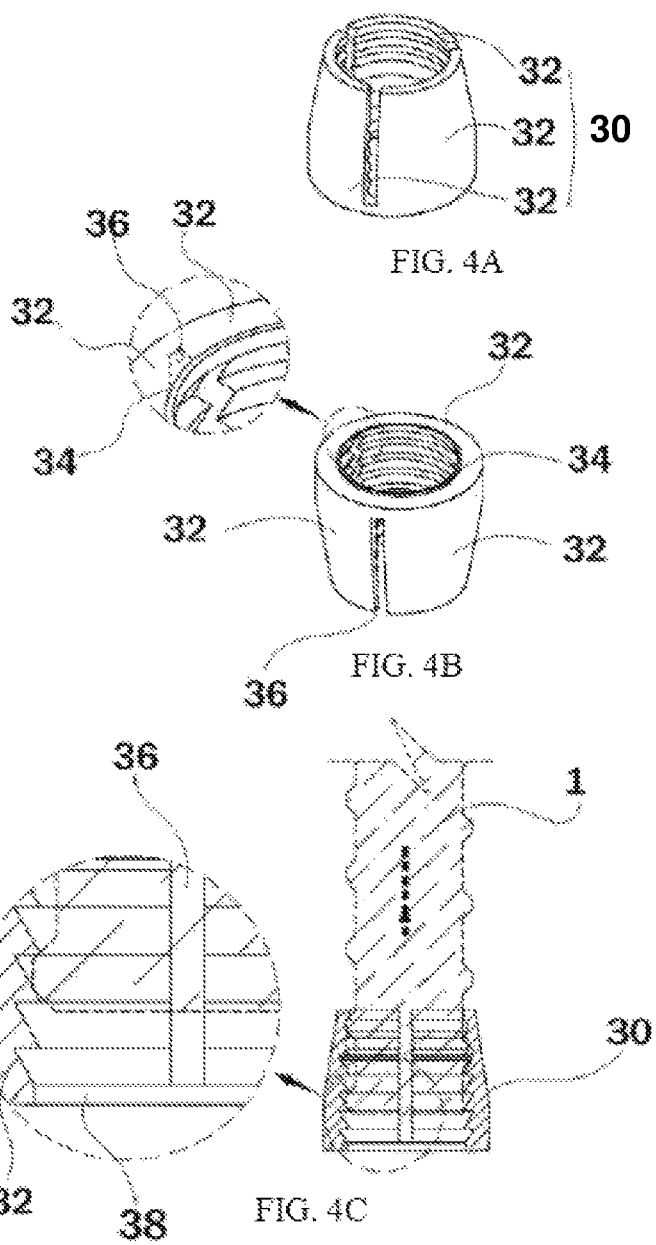

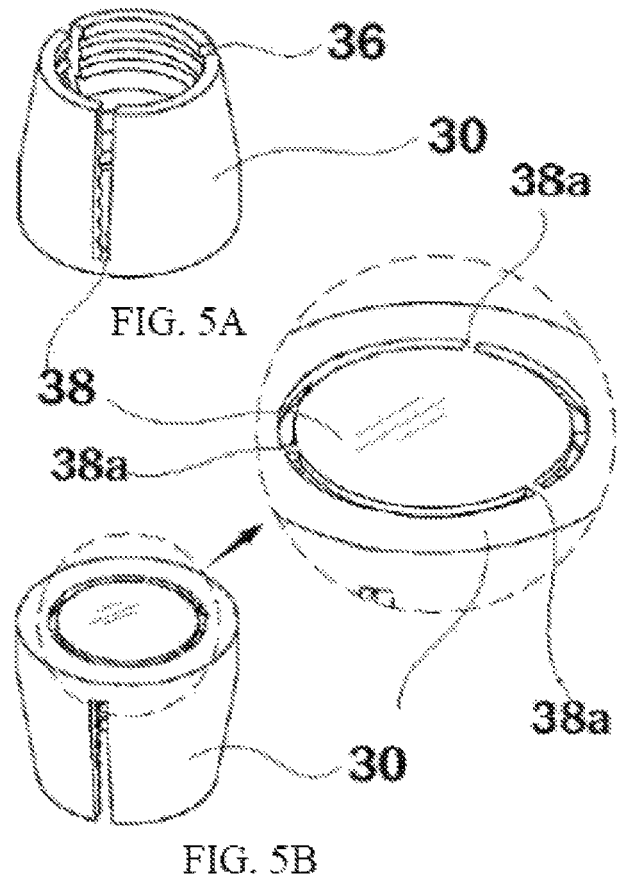

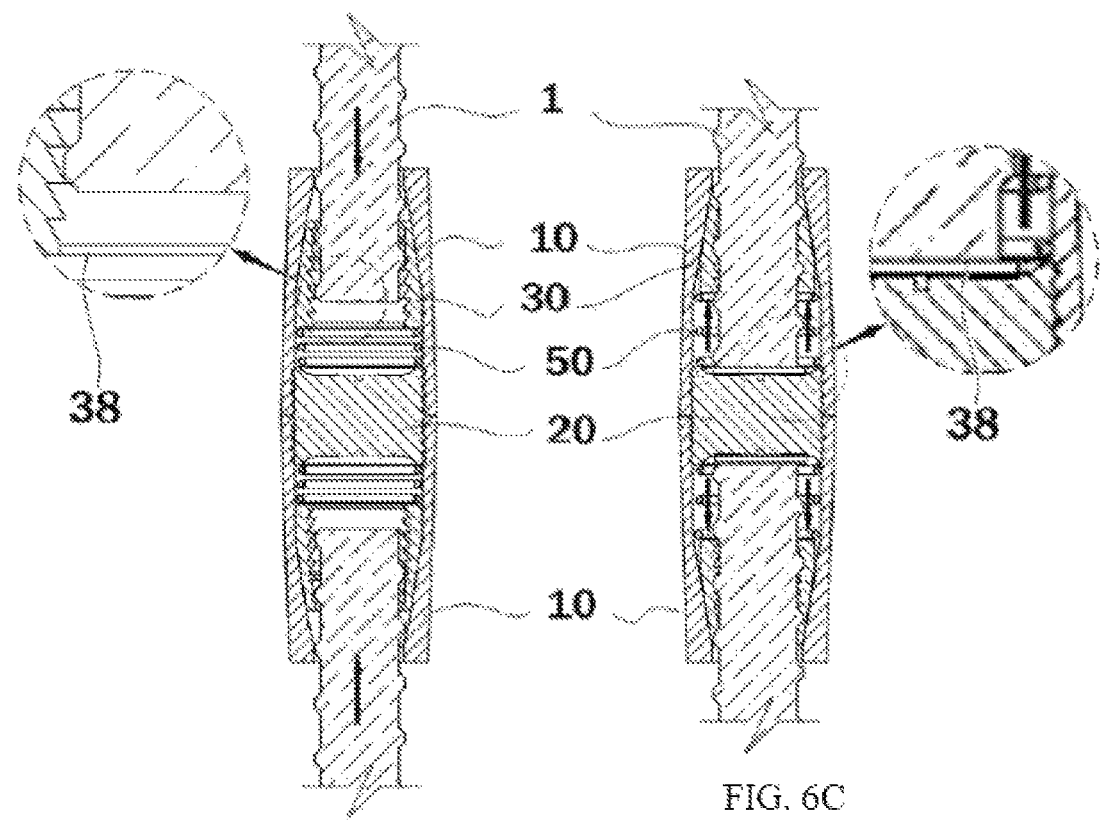
FIG. 6A
FIG. 6C
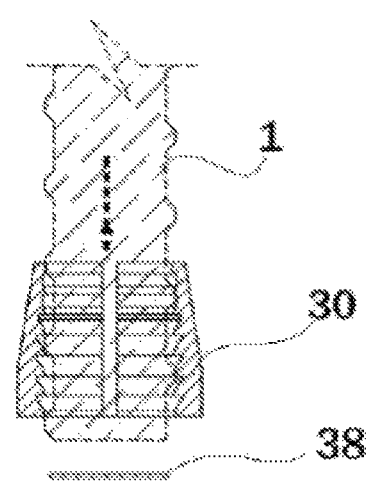
FIG. 6B

ONE-TOUCH CONNECTION DEVICE FOR CONNECTING REINFORCING BARS

TECHNICAL FIELD

The disclosure relates to a non-threaded, one-touch connection device for reinforcing steel bars ("rebars"), and in particular, a one-touch connection device for reducing the number of parts and minimizing air pockets inside the device when connecting the reinforcing bars.

BACKGROUND

Reinforcing steel bars (rebars) used in structures with reinforced concrete should be connected at regular intervals due to production limits in bar length or the method of construction. The conventional method of connecting rebars with couplers involves a machine-threaded rebar tip manually screwed onto the threaded end of a coupler. Screwing in each rebar takes considerable time, and threading both the rebar and coupler lowers assembly productivity.

To resolve these issues, the one-touch coupler under Korean Registered Patent No. 10-1602399 (Registered Mar. 4, 2014) was developed to include: a pair of coupler bodies with openings on both ends and a slightly inclined surface inside that gradually decreases in diameter as it reaches the outer opening, a support plate fixed between the two coupler bodies, a fastening part that is capable of receiving and fastening a rebar in place and is composed of multiple unit pieces along the circumference and placed on the inclined surface of the coupler body, an insertion area located in the inner circle of the fastening part, space-maintaining, bar-shaped protrusions on the walls of the insertion area and placed at predetermined intervals to maintain gaps between the various unit pieces found within the fastening part, an O-shaped ring seated on a groove along the outer circle of the fastening part, and a spring that is placed between the support plate and the fastening part to elastically lock the rebar in place when pressed onto the fastening part.

However, issues arose with the O-ring, such as its rubber material being oxidized when the coupler was stored for a long time, or the O-ring breaking down due to rain and moisture at the construction site. As a result, there is a serious problem in which the coupler could not fasten properly due to the fastening part being unable to move vertically when the spring pushed the rebar inside. The more the rebar moved around, the more the inner walls of the O-ring would wear down, resulting in an unsecured rebar.

In addition, this version of the one-touch coupler described above had to remain open when the rebars were inserted. If the O-ring was broken when the elastic force of the spring was applied, there was difficulty fastening the rebar in the correct position since the parts were not properly secured.

Several other examples of one-touch coupler are made to try to simplify the assembling process, such as Korean Patent Registration No. 10-0462291, Korean Patent Registration No. 10-1003302 and Korean Patent Registration No. 10-1259959. However, there are problems with the numerous parts required and the complicated structures in the conventional one-touch couplers.

The conventional one-touch couplers have another serious issue. An empty space is formed when the concrete cannot enter the inside of the connected coupler, which reduces the coupling strength and bonding force.

In addition, the conventional one-touch couplers do not provide any means for checking whether the rebars were fastened well to the inner end of the coupler body, since the inside of the coupler body is not visible.

SUMMARY

The one-touch connection device according to embodiments described herein solves the aforementioned problems of conventional one-touch couplers. A hole is provided for the concrete, which can flow in and out of the coupler body, so as to get rid of an empty space inside the coupler body to maintain a strong connection to the reinforcing bars. This hole also serves as a checking hole for quality assurance, allowing a worker to poke a thin measuring piece through the hole to check whether the reinforcing bars have reached the inner end of the coupler body. The embodiments provide advantageous effect to allow the reinforcing bars to easily slip into the coupler body while being properly fitted and locked in place. The one-touch connection device provides a simple configuration with less parts compared to the conventional one-touch coupler, and leads to faster assembly production and less undesired breakage caused by the complexity and quantity of parts.

In accordance with one embodiment, a one-touch connection device for connecting two reinforcing bars together includes a pair of coupler bodies each having a hollow space configured for receiving a reinforcing bar; a connector fastened to the pair of coupler bodies together; a pair of locks disposed in the pair of coupler bodies, respectively, each lock configured to fasten one of the pair of reinforcing bars in the corresponding coupler body; a pair of elastic members each disposed between the connector and one of the pair of locks, wherein the each lock has one end with a breaking disc, and when one of the pair of reinforcing bars is inserted into the corresponding coupler body in an insertion direction and pushed onto the breaking disc, the lock is configured to move with the one reinforcing bar in the insertion direction, the breaking disc is configured to break away from the corresponding lock by insertion of the reinforcing bar, and the elastic member is configured to apply an elastic force to move the lock in a direction opposite to the insertion direction to fasten the reinforcing bar in the corresponding lock.

In accordance with an aspect of the embodiment, each coupler body includes a checking hole configured to allow concrete to flow inside and outside of the corresponding coupler body.

In accordance with an aspect of the embodiment, the checking hole is configured to be located at a position where one of the pair of reinforcing bars and one of the pair of elastic members meet in the corresponding coupler body.

In accordance with an aspect of the embodiment, each of the pair of coupler bodies includes a first end to receive one of the pair of reinforcing bars and a second end opposite to the first end in the insertion direction, and the each coupler body further includes a sloped inner surface such that an inner diameter of the coupler body gradually increases from the first end toward the second end.

In accordance with an aspect of the embodiment, the each coupler body further has an entrance at the first end, and the entrance is sloped to match an angle of the sloped inner surface.

In accordance with an aspect of the embodiment, the each lock includes slits and wall parts partially separated by the slits and configured to be bent by the reinforcing bar inserted in the lock.

In accordance with an aspect of the embodiment, the slits extend from a first edge of the lock toward the breaking disc without reaching a second edge of the end with the breaking disc such that the wall parts are connected to each other at the second edge.

In accordance with an aspect of the embodiment, the lock includes a plurality of breakable pieces connected to the breaking disc and configured to be broken by the insertion of the reinforcing bar to cause the breaking disc to break away from the lock.

In accordance with an aspect of the embodiment, the plurality of breakable pieces is spaced away from each other in a circumferential direction of the breaking disc, and each of the plurality of breakable pieces is elongated in a radial direction of the breaking disc.

In accordance with an aspect of the embodiment, in each coupler body, the breaking disc is configured to be disposed between the reinforcing bar and the connector after the reinforcing bar is fastened to the lock.

In accordance with an aspect of the embodiment, each lock has an inner surface provided with a plurality of protrusions protruding in a direction opposite to the insertion direction of the reinforcing bar.

In accordance with an aspect of the embodiment, each lock includes a sloped outer surface corresponding to the sloped inner surface of the corresponding coupler body.

In accordance with an aspect of the embodiment, each coupler body has the second end with threads engaged with threads of the connector, and the first end with the sloped entrance without threads.

In accordance with another embodiment, a one-touch connection device for connecting two reinforcing bars together including a pair of coupler bodies each having a hollow space configured for receiving a reinforcing bar in an insertion direction; a connector fastened to the pair of coupler bodies together; a pair of locks disposed in the pair of coupler bodies, respectively, each lock configured to fasten one of the pair of reinforcing bars in the corresponding coupler body; and a pair of elastic members each disposed between the connector and one of the pair of locks, wherein said each lock includes slits and a breaking disc, said each coupler body includes a checking hole configured to be located at a position where one of the pair of reinforcing bars and one of the pair of elastic members meet in the corresponding coupler body to allow concrete to flow inside and outside of the corresponding coupler body, each of the pair of coupler bodies includes a first end to receive one of the pair of reinforcing bars and a second end opposite to the first end in the insertion direction, and said each coupler body further includes a sloped inner surface such that an inner diameter of the coupler body gradually increases from the first end toward the second end.

In accordance with another embodiment, a method of connecting two reinforcing bars by a one-touch connection device includes a pair of coupler bodies, a connector fastened to the pair of coupler bodies together, a pair of locks disposed in the pair of coupler bodies, respectively, a pair of elastic members disposed between the connector and one of the pair of locks, wherein each lock has one end with a breaking disc. The method includes: for each of the pair of couple bodies, inserting one of the pair of reinforcing bars into the coupler body in an insertion direction, wherein the lock is moved by the insertion of the reinforcing bar in the insertion direction to reach the elastic member, and continuing the insertion of the one reinforcing bar to break the breaking disc of the lock to cause the elastic member to apply an elastic force to move the lock in the direction opposite to the insertion direction and to cause protrusions of the lock to be engaged with ribs of the reinforcing bar. At that point, the lock fixedly connected to the reinforcing bar and the reinforcing bar is unable to be removed, effectively resulting in fastening the reinforcing bars together with the one-touch connection device.

In accordance with an aspect of the embodiment, the method further includes pouring concrete into a gap between the reinforcing bar and the corresponding coupler body before the reinforcing bar comes to contact with the lock.

According to the embodiments of the one-touch connection device, before the breaking disc is broken, the lock is a single, cohesive body, resulting in less individual parts that need to be manufactured. This reduces costs and increases assembly productivity. It should also be noted that the O-ring mentioned in the conventional one-touch coupler is not used in this invention, removing the problems that came along with it.

BRIEF DESCRIPTIONS OF THE DRAWINGS

One or more embodiments are illustrated by way of example, and not by limitation, in the figures of the accompanying drawings, wherein elements having the same reference numeral designations represent like elements throughout.

FIG. 4A is a perspective view of the lock in an upright state, FIG. 4B is a perspective view of the lock in an upside down state without a breaking disc, and FIG. 4C is a cross-section view of the lock with the breaking disc, in a state the reinforcing bar is inserted in the lock.

FIG. 5A is a perspective view of the lock in an upright state, and FIG. 5B shows the breaking lock in an upside down state with the breaking disc.

FIG. 6A is a cross-section view of the one-touch connection device connecting two reinforcing bars before the spring activates, FIG. 6B is a cross-section view of the lock in which the reinforcing bar is inserted and the breaking disc breaks away from the lock, and FIG. 6C is a cross-section view of the one-touch connection device connecting two reinforcing bars after the spring activates.

DETAILED DESCRIPTION

Figure 1:
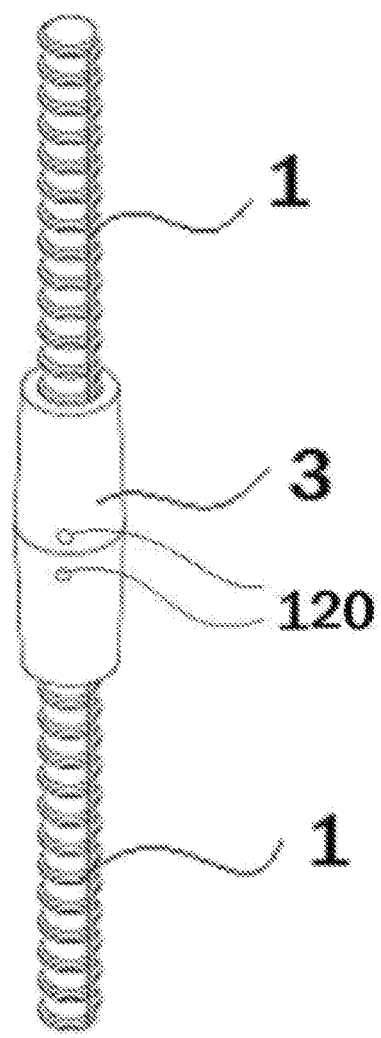
FIG. 1 is a perspective view of a one-touch connection device according to some embodiments in a state in which two reinforcing bars are coupled to the one-touch connection device.

The disclosure herein provides many different embodiments, or examples, for implementing different features of the disclosed subject matter. Specific examples of components and arrangements are described below to simplify the present disclosure. These are examples and are not intended to be limiting.

This description of the various embodiments is intended to be read in connection with the accompanying drawings, which are to be considered part of the entire written description. In the description, relative terms such as "before," "after," "above," "below," "up," "down," "top" and "bottom" as well as derivative thereof (e.g., "vertical," "downward," "upward," "upright" "upside down" etc.) should be construed to refer to the orientation as then described or as shown in the drawing under discussion. These relative terms are for convenience of description and do not require that the system be constructed or operated in a particular orientation. Terms concerning attachments, coupling and the like, such as "connected" refer to a relationship wherein components are attached to one another either directly or indirectly through intervening components, unless expressly described otherwise. In the following description, "fixedly connected to each other" or "fixed to each other" means to connect elements to each other such that the connected elements move together and do not move relative to each other.

FIG. 1 shows a one-touch connection device according to some embodiments in a state in which two reinforcing bars are fixedly connected to the one-touch connection device. In FIG. 1, the one-touch connection device 3 fixedly connects a pair of reinforcing bars 1 together. The one-touch connection device 3 has two halves defining a pair of coupler bodies 10. The reinforcing bars are inserted into the coupler bodies 10 from an entrance of the corresponding coupler body 10 in an insertion direction. Referring to FIG. 1, the insertion direction is the vertical direction.

Further, each half or each coupler body 10 has a checking hole 120. In some embodiments, each half or each coupler body 10 may have more than one checking hole 120. As shown in FIG. 1, in each coupler body 10, the checking hole 120 is disposed on a side further from the entrance of the coupler body 10. The coupler bodies 10 are cylindrical tubes and, when the coupler bodies 10 are connected together, the combined coupler bodies 10 form a slight oval shape as shown in FIG. 1.

To use the one-touch connection device 3 to fixedly connect the reinforcing bars 1 together, after the reinforcing bars 1 are inserted into the entrances of the coupler bodies 10 and before the reinforcing bars 1 come to contact with locks 30 (will be described in details later below) in the coupler bodies 10, concrete enters the coupler bodies 10 through a small gap between the reinforcing bars 1 and the entrances of the coupler bodies 10. After the locks 30 fasten onto the corresponding reinforcing bar 1, it will be difficult for any concrete to flow through the locks 30. Thus, the coupler bodies 10 include the checking holes 120, which allow the concrete on the side further from the entrance of the coupler body 10 to flow in and out from the checking holes. In this way, concrete can flow into the inside of the coupler bodies 10 and air pockets in the coupler bodies 10 can be minimalized. Preventing air pockets makes it possible to strengthen the fixed connection of the reinforcing bars 1 in the one-touch connecting device 3 after concrete is poured and hardened.

The checking holes 120 of the coupler bodies 10 further allow a supervisor or worker to check whether an end of the reinforcing bar 1 properly reaches an end (opposite to the entrance of the coupler body 10) of the corresponding coupler body 10 by inserting a meter reading needle or a thin bar into one or more of the checking holes 120.

Figure 2:
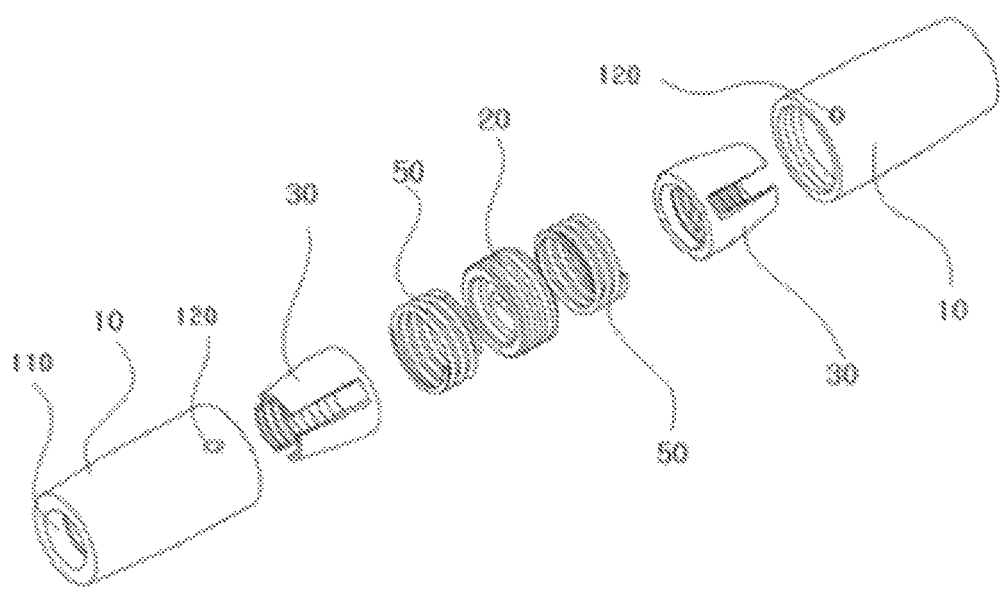
FIG. 2 is an exploded perspective view of the one-touch connection device according to some embodiments.

FIG. 2 is an exploded perspective view of the one-touch connection device according to some embodiments. The one-touch connection device 3 includes the two coupler bodies 10, a connector 20, two locks 30, and two springs (elastic members) 50. The components (coupler bodies 10, connector 20, locks 30, and springs 50) are connected together in an axial direction of the one-touch connection device.

Each of the coupler bodies 10 is made of a rigid, metal material. Each of the coupler bodies 10 is hollow from a first end defining the entrance for receiving the reinforcing bar 1 to a second end opposite to the first end in the axial direction. The two hollow coupler bodies 10 are fixedly connected with the connector 20. The connector 20, springs 50, and locks 30 are configured to fit inside a hollow space 12 of the coupler bodies 10. The coupler bodies 10 are configured to fit the connector 20 therein.

It should be noted that the one-touch connection device 3 is symmetrical with respect to the connector 20, and the two coupler bodies or halves 10 fit the same composition of parts. In particular, one coupler body 10 is configured to fit one lock 30 and one spring 50.

From this point onwards, a top half of the one-touch connection device 3 including one coupler body 10, one lock 30, and one spring 50 will be referenced while explaining the mechanisms of the one-touch connection device 3, instead of mentioning the components in both halves or both coupler bodies.

Figure 3:
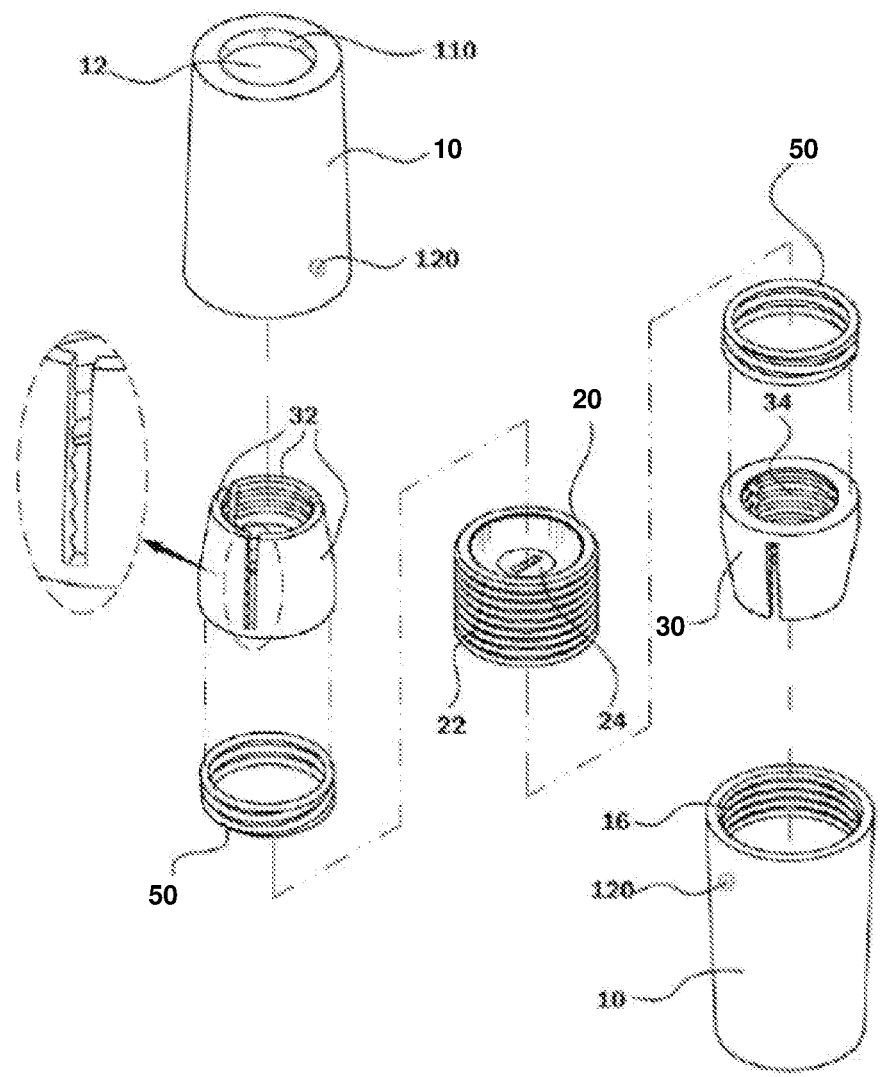
FIG. 3 is an enlarged perspective view of each component of the one-touch connection device according to some embodiments.

FIG. 3 is an enlarged perspective view of each component of the one-touch connection device according to some embodiments. Referring to FIG. 3, the coupler body 10 has a slightly angled structure forming a trapezoidal cylindrical shape and has a hollow space 12. The entrance of the coupler body 10 includes an entrance wall 110, which is sloped, instead of being straight, to match a sloped inner wall of the coupler body 10 so that the reinforcing bar 1 may easily slip into the hollow space 12 of the coupler body 10 via the sloped entrance wall 110. The coupler body 10 includes a threaded inner surface at the second end of the coupler body 10. The threaded inner surface of the coupler body 10 includes female screw threads 16.

The connector 20 is made in a substantially cylindrical shape, and having a threaded outer surface. The outer surface of the connector 20 includes male screw threads 22 that screw into the female screw threads 16 of the coupler body 10. An insert 24 is formed in a center of the connector for assembly machines to hold the insert part during production.

When the lock 30 is positioned in an upright state, the lock 30 has a top end and a bottom end opposite to the top end, and the top end of the lock 30 has a smaller diameter than the bottom end. The lock 30 has multiple wall parts 32 separated by multiple slits or cutouts 36 while still being connected to each other at the bottom end so as to make the lock 30 a singular, cohesive piece. The slits or cutouts 36 are elongated along the axial direction. The lock 30 has an inner surface provided with downward-facing, angled bars of ribbed protrusions or teeth 34, which are arranged at regular intervals in the axial direction. The ribbed protrusions or teeth 34 are configured to engage with bumps or protrusions of the reinforcing bar 1 and to provide resistance when the lock 30 is pushed upwardly by the spring 50.

Referring to FIGS. 4A-4C, in the one-touch connection device, there are three wall parts 32 separated by the slits 36. In some embodiments, there might be different numbers of wall parts of the lock 30 or different numbers of slits 36. The slits 36 allow the wall parts 32 to slightly bend as necessary to allow the reinforcing bar 1 inside to be fastened onto the lock 30.

FIG. 4A is a perspective view of the lock 30 in an upright state. Referring to FIG. 4A, the bottom end of the lock 30 is not separated by the vertical cutouts 36 around its circumference. That is, the slits 36 extend from the top edge of the lock 30 and terminate before reaching the bottom edge of the lock 30. Further, the lock 30 includes a hollow space for receiving the reinforcing bar therein.

FIG. 4B is a perspective view of the lock 30 in an upside down state without a breaking disc 38, where the bottom end of the lock 30 faces upward.

FIG. 4C is a cross-section view of the lock 30 with the breaking disc 38, in a state the reinforcing bar 1 is inserted in the lock 30. Referring to FIG. 4C, the reinforcing bar 1 is inserted downward in the lock 30. The close-up view in FIG. 4C shows the breaking disc 38 located at the very bottom of the lock 30 before the breaking disc 38 is broken by the reinforcing bar 1.

FIG. 5A is a perspective view of the lock 30 in an upright state, and FIG. 5B shows the lock 30 in an upside down state with the breaking disc 38. Referring to FIG. 5B, the breaking disc 38 of the lock 30 is still intact, i.e., before broken. The breaking disc 38 is connected to a bottom edge or rim of the lock 30 through several small breakable pieces 38a. The breakable pieces 38 are spaced away from each other in a circumferential direction of the breaking disc 38, and each of the breakable pieces 38a is elongated in a radial direction of the breaking disc 38. The breakable pieces 38a and the breaking disc 38 with other components of the lock 30 are formed of a single casting piece; therefore, the components of the lock 30 including the breakable pieces 38a and the breaking disc 38 are made of the same material. In some embodiments, the breakable pieces 38a may have the same thickness as the breaking disc 38. In some embodiments, the diameter or size of the breaking disc 38 is adaptable to one or more characteristics of the spring 50. The breakable pieces 38a are configured to easily break away from the bottom edge or rim of the lock 30 by a force applied onto the breaking disc 38, which will be described later. In the top coupler body 10 of the one-touch connecting device 3, the bottom rim of the lock 30 is facing towards the spring 50 and a center of the one-touch connection device 3 where the connector 20 resides.

FIG. 6A is a cross-section view of the one-touch connection device connecting two reinforcing bars 1 before the spring 50 activates. FIG. 6C is a cross-section view of the one-touch connection device fixedly connecting two reinforcing bars 1 after the spring 50 activates.

As shown in FIGS. 6A and 6C, the coupler bodies 10 have their outer surfaces being straight, which are different from the example where the coupler bodies 10 have sloped outer surfaces as shown in FIGS. 1-3. Further as shown in FIGS. 6A and 6C, the inner diameter of the coupler body 10 gradually increases from the entrance where the reinforcing bar is inserted toward another, opposite, side of the coupler body 10 in the axial direction. This configuration of the coupler body 10 provides sufficient room for the lock 30, spring 50, and connector 20 to fit inside the coupler body 10. The wall parts 32 of the lock 30 are also sloped or curved to match the sloped or curved inner surface of the coupler body 10 so that the lock 30 can properly fit inside the coupler body 10.

As shown in FIG. 6A, the lock 30 is inserted downward by the reinforcing bar 1. Upon the lock 30 reaching the spring 50, the insertion/pushing force of the reinforcing bar 1 breaks the breaking disc 38 to cause the spring 50 to apply an elastic force upward and toward the lock 30. The lock 30 is then moved upward by the elastic force of the spring 50.

FIG. 6B is a cross-section view of the lock 30 to show that the reinforcing bar 1 is inserted downward in the lock 30. As shown in FIG. 6B, the breaking disc 38 breaks away from the lock 30 upon pushing or inserting the reinforcing bar 1 further to reach the breaking disc 38. The other components of the one-touch connection device are omitted in FIG. 6B.

As shown in FIG. 6C, the lock 30 has been moved upwards due to the elastic force of the spring 50 and the reinforcing bar 1 is fastened to the lock 30, where the protrusions or teeth 40 are engaged with the bumps or protrusions of the reinforcing bar 1. The breaking disc 38 breaks away from the lock 30 and then is disposed between the reinforcing bar 1 and the connector 20.

In this manner, the one-touch connection device described above includes the lock formed of a single piece including the breaking disc and is able to resolve the problems of the conventional one-touch coupler. Assembling the conventional coupler was difficult partly due to the locking unit being composed of multiple, individual pieces and requiring additional components to connect them. It is time-consuming and complicated to make multiple, individual pieces for the locking unit in the conventional one-touch coupler. In addition, such complicated manufacture would increase the unit price of the coupler.

According to at least one embodiment of the one-touch connection device, a method of connecting two reinforcing bars 1 by the one-touch connection device 3 includes inserting each reinforcing bar 1 into the corresponding coupler body 10 in an insertion direction, pouring concrete into a gap between the reinforcing bar 1 and the corresponding coupler body 10 before the reinforcing bar 1 comes to contact with the lock 30 inside the coupler body 10, continuing the insertion of each reinforcing bar 1 into a hollow space of the lock 30 to cause the lock to move in the insertion direction and to break the breaking disc 38 of the lock 30 such that the spring 50 applies an elastic force to move the lock 30 in a direction opposite to the insertion direction and the protrusions of the reinforcing bar 1 are engaged with the protrusions of the lock 30. Therefore, the two reinforcing bars 1 are fixedly connected together by the one-touch connection device 3.

Other modifications can be made to the embodiments of the one-touch connection device. Additional parts can be added to the entrance of the coupler body, where there may be an empty space between the reinforcing bar and the coupler body. However, it may not be necessary because concrete can enter through the entrance of the coupler body and can fill the empty space up to the point of the lock. Further, the one-touch connection device can be further adjusted to fit varying types of reinforcing bars if desired, for example, this can be done by either adjusting the design of the one-touch connection device and/or adding an additional conversion piece or adaptor onto the one-touch connection device.

In the embodiments described above, the elastic member is a compression coil spring or something similar; however, the elastic member is not limited to a compression coil type spring and could also be a highly elastic plate spring.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A one-touch connection device for connecting two reinforcing bars together, the one-touch connection device comprising:
 a pair of coupler bodies each having a hollow space configured for receiving a reinforcing bar;

a connector fastened to the pair of coupler bodies together;

a pair of locks disposed in the pair of coupler bodies, respectively, each lock configured to fasten one of the pair of reinforcing bars in the corresponding coupler body; and a pair of elastic members each disposed between the connector and one of the pair of locks, wherein said each lock is formed of a single piece including:
 a breaking disc at one end of the lock;
 slits;
 wall parts partially separated by the slits and configured to be bent by one of the pair of reinforcing bar inserted in the corresponding lock, wherein the slits extend from a first edge of the lock toward the breaking disc without reaching a second edge of the one end with the breaking disc such that the wall parts are connected to each other at the second edge; and
 a plurality of breakable pieces connected to the breaking disc and configured to be broken by the insertion of the corresponding reinforcing bar to cause the breaking disc to break away from the lock, the plurality of breakable pieces is spaced away from each other in a circumferential direction of the breaking disc, each of the plurality of breakable pieces is elongated in a radial direction of the breaking disc, and when one of the pair of reinforcing bars is inserted into the corresponding coupler body in an insertion direction and pushed onto the breaking disc,
 the lock is configured to move with the one reinforcing bar in the insertion direction,
 the breaking disc is configured to break away from the corresponding lock by insertion of the reinforcing bar, and
 the corresponding elastic member is configured to apply an elastic force to move the lock in a direction opposite to the insertion direction to fasten the reinforcing bar in the corresponding lock.

2. The one-touch connection device according to claim 1, wherein
said each coupler body includes a checking hole configured to allow concrete to flow inside and outside of the corresponding coupler body.

3. The one-touch connection device according to claim 2, wherein
the checking hole is configured to be located at a position where one of the pair of reinforcing bars and one of the pair of elastic members meet in the corresponding coupler body.

4. The one-touch connection device according to claim 1, wherein
each of the pair of coupler bodies includes a first end to receive one of the pair of reinforcing bars and a second end opposite to the first end in the insertion direction, and
said each coupler body further includes a sloped inner surface such that an inner diameter of the coupler body gradually increases from the first end toward the second end.

5. The one-touch connection device according to claim 4, wherein said each coupler body further has an entrance at the first end, and the entrance is sloped to match an angle of the sloped inner surface.

6. The one-touch connection device according to claim 5, wherein said each coupler body has
the second end with threads engaged with threads of the connector, and
the first end with the sloped entrance without threads.

7. The one-touch connection device according to claim 4, wherein said each lock includes a sloped outer surface corresponding to the sloped inner surface of the corresponding coupler body.

8. The one-touch connection device according to claim 1, wherein in said each coupler body, the breaking disc is configured to be disposed between the reinforcing bar and the connector after the reinforcing bar is fastened to the lock.

9. The one-touch connection device according to claim 1, wherein said each lock has an inner surface provided with a plurality of protrusions protruding in a direction opposite to the insertion direction of the reinforcing bar.

* * * * *